April 29, 1958 — J. J. HILL — 2,832,370

AUTOMATIC BLENDING RESERVOIR

Filed Nov. 19, 1956

INVENTOR.
JAMES J. HILL
BY

United States Patent Office 2,832,370
Patented Apr. 29, 1958

2,832,370

AUTOMATIC BLENDING RESERVOIR

James J. Hill, Miami, Fla., assignor, by mesne assignments, to APCO, Inc., New York, N. Y., a corporation of New York Application November 19, 1956, Serial No. 623,116

1 Claim. (Cl. 137—391)

This invention relates in general to float controlled reservoirs for liquids and, more particularly, to a reservoir having two inter-connected chambers for blending and dispensing beverages and for automatically maintaining a supply of beverage therein.

Dual reservoirs previous to this invention in which one chamber is used for blending and a second chamber used for maintaining a supply of beverage employ electric solenoid valve means connecting the two chambers and a pair of spaced electrodes in each chamber for independently and electrically controlling the level of beverage in each chamber. This method, in addition to its complication and high cost causes an undesirable electrolitic action in the beverage as a result of ionization of the liquid between electrodes.

The present invention overcomes the above objections and disadvantages by the novel use of a pair of mechanically inter-connected floats cooperating with a single external electric switch for blending a beverage in one chamber and automatically transferring the blended beverage to a storage chamber for use and provides the principal object of the invention.

A further object of the invention is the provision of a blending chamber and a storage chamber inter-connected by a passage controlled by a float valve for releasing the blended beverage from a blending chamber into a storage chamber including a second float articulated with the float valve for controlling the flow and blending the incoming beverage in the blending chamber.

These and other objects and advantages in one embodiment of the invention are described and shown in the appended specification and drawing in which.

It is to be understood that beverages, like coffee, when made in automatic devices are usually produced in unit quantities and the first portion of the resultant beverage delivered is of strong concentration whereas the last portion of the unit delivery is of weak concentration, hence, the necessity of providing a reservoir adapted to blend each unit quantity by turbulence and diffusion before being transferred to a second chamber of temporary storage and use.

Figure 1:
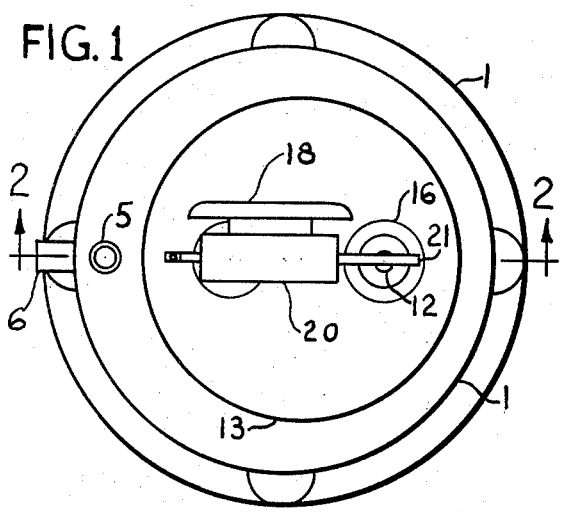
Fig. 1 is a top view of the reservoir.
Figure 2:
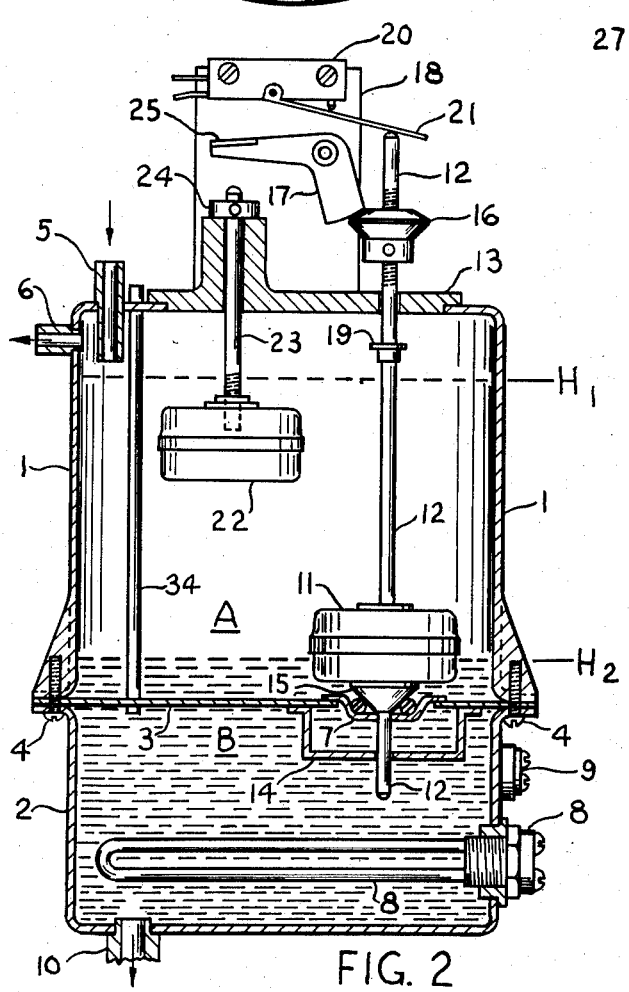
Fig. 2 is a cross-sectional side elevation of the reservoir taken through section-line 2—2, Fig. 1.

Referring to Figures 1 and 2, the reservoir consists of an upper casing 1 and a lower casing 2 having a partition plate 3 sealed therebetween by fasteners 4, as shown, forming a blending chamber A and a supply chamber B.

The casing 1 is provided with inlet and overflow connections 5 and 6 respectively. A passage betwen chambers A and B is provided by a valve seat assembly 7. Casing 2 has projecting therein, an emersion type electric heater 8. An electric thermostat 9 is secured against the outside surface of casings. An outlet connection 10 in the bottom of casing 2 permits the gravity discharge of the beverage.

A transfer float 11 is secured in coaxial relation with a rod 12 and journalled for reciprocating movement in cover plate 13 of casing 1 and bracket 14 fixed to plate 3, as shown.

A valve member 15 is fixed in coaxial relation on rod 12 beneath float 11 and is adapted to engage the seat 7 to close the passage between chambers A and B when in position shown Fig. 2.

A latch collar 16 is adjustably threaded on the upper portion of rod 12 for engagement with a latch member 17 pivoted on upright 18. A stop collar 19 fixed to rod 12 limits the upward movement of the transfer float.

A normally closed electric switch 20 is secured to upright 18 and has its operating arm 21 positioned in the path of movement of the upper end of rod 12.

An upper level limit float 22 is adjustably and coaxially secured to a rod 23 slidably retained in plate 13 and retained against the action of gravity by a collar 24. The outward projecting portion 25 of the latch 17 is positioned in the path of movement of the upper end of rod 23.

Figure 4:
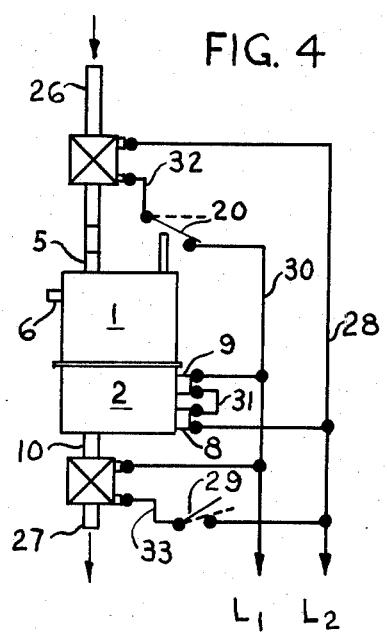
Fig. 4 is a schematic diagram of the reservoir and its operational connections.

Referring to the operational diagram Fig. 4, the inlet connection 5 of the reservoir is connected, through a normally closed solenoid valve by a conduit 26, to a source of pressurized beverage to be blended. The outlet connection 10 of the reservoir is connected through a normally closed solenoid valve to a dispensing conduit 27.

A conductor 28 connects one terminal of the input solenoid, one terminal of the heater 8 and one terminal of a dispensing switch 29 with one side of a source of electric power $L_2$.

Conductor 30 connects one terminal of control switch 20, one terminal of thermostat 9, one terminal of the dispensing solenoid with the remaining side of the source of power $L_1$.

Conductor 31 connects the remaining terminal of thermostat 9 with the remaining terminal of heater 8.

Conductor 32 connects the remaining terminal of the input soleniod to the remaining terminal of control switch 20.

Conductor 33 connects the remaining terminal of the dispensing solenoid with the remaining terminal of the dispensing switch 29.

It is to be understood that the control switch 20 can be readily connected to other electrical means for delivering the beverage from a source as an alternate to the input solenoid shown and described.

In operation and referring to Fig. 2, under the assumption that sufficient beverage has been dispensed through outlet 10 to reduce the level in the reservoir to a height $H_2$, the float 11 will have lowered to the position shown and close the valve 15 and close switch 20 to energize the input solenoid to begin a refilling cycle. Simultaneously, the latch 17, under rotation by the action of gravity, will engage collar 16 and prevent float 11 from rising with the incoming beverage, thus closing the passage between chambers A and B.

Figure 3:
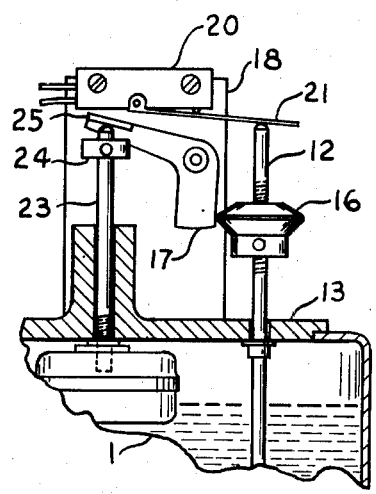
Fig. 3 is a fragmentary elevation shown Fig. 2 with elements in changed position.

When a predetermined quantity of beverage has entered chamber A, determined by the adjustment of rod 23, the float 22 will rise sufficiently to rotate latch 17 and release its engagement with collar 16. Thus, float 11 will rise to its upper limit determined by collar 19 and open switch 20 and valve 15, as illustrated in Fig. 3, to permit the now blended beverage to descend by gravity into chamber B where it is maintained in a predetermined temperature by heater 8 under the control of thermostat 9.

An open vent tube 34 is provided in chamber B running through chamber A to permit unrestricted flow from chamber B of beverage from the outlet connection 10. A connection 6 is provided in the upper end of chamber A as an air vent and an overflow by-pass in the event of the failure of any components to cut off the flow of beverage from its source.

Having described my invention, I claim:

A liquid reservoir comprising a casing having a partition therein forming an upper blending chamber and a lower storage chamber, electrically operated liquid delivery means connected with said upper chamber for filling said casing with unblended liquid when energized, discharge means connected with said lower chamber for draining blended liquid from same when operated, valve means in said partition forming a passage through said partition normally held closed by action of gravity, a transfer float adapted for vertical movement in said upper chamber corresponding to the liquid level therein, said transfer float operatively connected to said valve means and including a projection extending through said casing, a normally closed electric switch on said casing positioned for operation by said projection for energizing said delivery means when closed, latch means on casing adapted to engage and hold said projection when said float means has decended to its lowermost position for holding said valve means closed, a second float means in said upper chamber adapted for vertical movement by liquid therein, a trip member fixed to said second float means positioned to engage and release said latch means when said upper chamber is filled with liquid to a predetermined level whereby the descent of blended liquid in said upper chamber by discharge through said discharge means and the corresponding descent of said transfer float means to its lowermost position will close said valve means to be temporarily held closed by said latch means and simultaneously close said switch to energize said liquid means to refill and blend in said upper chamber to said predetermined level and raise said second float means to release said transfer float means to raise and open said switch to de-energize said liquid means and permit said blended liquid to gravitate into said lower chamber.

References Cited in the file of this patent

UNITED STATES PATENTS

| | | |
|---|---|---|
| 1,065,899 | Guyton et al. | June 24, 1913 |
| 2,412,452 | Green | Dec. 10, 1946 |